(12) United States Patent
Raberin et al.

(10) Patent No.: US 8,246,255 B2
(45) Date of Patent: Aug. 21, 2012

(54) DEVICE FOR THE AXIAL LOCKING OF A GUIDE SHAFT BEARING IN A TURBOMACHINE

(75) Inventors: Laurent Raberin, Paris (FR); Stephane Rousselin, Hericy (FR); Regis Eugene Henri Servant, Vigneux sur Seine (FR)

(73) Assignee: SNECMA, Paris (FR)

( * ) Notice: Subject to any disclaimer, the term of this patent is extended or adjusted under 35 U.S.C. 154(b) by 480 days.

(21) Appl. No.: 12/471,747

(22) Filed: May 26, 2009

(65) Prior Publication Data

US 2009/0297083 A1 Dec. 3, 2009

(30) Foreign Application Priority Data

May 29, 2008 (FR) ...................................... 08 02924

(51) Int. Cl.
*F16C 43/04* (2006.01)
(52) U.S. Cl. ............................. 384/539; 384/561; 403/28
(58) Field of Classification Search .................. 384/903, 384/559, 561, 539, 537; 403/28–30; 415/9, 415/12, 229; 416/2, 174
See application file for complete search history.

(56) References Cited

U.S. PATENT DOCUMENTS

| | | | |
|---|---|---|---|
| 3,402,750 A * | 9/1968 | Wilkinson et al. | |
| 3,750,489 A * | 8/1973 | Caldwell | |
| 4,836,750 A * | 6/1989 | Modafferi et al. | ........... 403/28 X |
| 5,226,683 A * | 7/1993 | Julien et al. | |
| 5,320,488 A * | 6/1994 | Meade et al. | |
| 5,685,650 A | 11/1997 | Martinie et al. | |
| 5,863,137 A * | 1/1999 | Johnson et al. | ................ 384/537 |
| 6,338,578 B1 * | 1/2002 | Adde et al. | ................ 384/537 X |
| 6,749,517 B2 * | 6/2004 | Ouchi | |
| 7,051,511 B2 * | 5/2006 | Prytz | |
| 7,121,632 B2 * | 10/2006 | Grabaum | ................... 384/903 X |
| 7,452,188 B2 * | 11/2008 | Bouchard | |
| 7,699,556 B2 * | 4/2010 | Efremov | ....................... 403/30 X |
| 7,775,723 B2 * | 8/2010 | Maffre | ........................... 384/537 |
| 7,836,596 B2 * | 11/2010 | Suciu et al. | |
| 7,942,635 B1 * | 5/2011 | Murray | ...................... 415/229 X |
| 2001/0016520 A1 * | 8/2001 | Sahashi et al. | |
| 2002/0044706 A1 * | 4/2002 | Kayama et al. | |
| 2005/0013696 A1 * | 1/2005 | Le Jeune et al. | |
| 2006/0233479 A1 * | 10/2006 | Bouiller et al. | ................ 384/561 |
| 2007/0177936 A1 * | 8/2007 | Servant | |
| 2008/0317594 A1 * | 12/2008 | Servant | .......................... 415/229 |
| 2010/0135785 A1 * | 6/2010 | Just | ................................ 415/229 |

(Continued)

FOREIGN PATENT DOCUMENTS

EP 0 987 457 A1 3/2000

(Continued)

*Primary Examiner* — Gregory Binda
*Assistant Examiner* — Matthieu Setliff
(74) *Attorney, Agent, or Firm* — Oblon, Spivak, McClelland, Maier & Neustadt, L.L.P.

(57) ABSTRACT

A guide shaft bearing including an internal ring mounted on a cylindrical contact surface of a shaft and a device for the axial locking of the ring including a ring mounted sliding on the cylindrical contact surface and an annular rib made of shape memory material mounted in two annular grooves of the cylindrical contact surface and of the ring is disclosed. The annular rib is able to expand radially by shape memory effect when it is subjected to a temperature greater than a transition temperature of its material to pass to a locking position of the ring on the cylindrical contact surface.

14 Claims, 3 Drawing Sheets

U.S. PATENT DOCUMENTS

2012/0014790 A1 * 1/2012 Zacharias .................... 415/229

FOREIGN PATENT DOCUMENTS

| | | | |
|---|---|---|---|
| EP | 1 498 624 A1 | 1/2005 | |
| EP | 1 712 806 A2 | 10/2006 | |
| EP | 1 813 792 A1 | 8/2007 | |
| FR | 2 734 874 | 12/1996 | |
| JP | 63290139 A * | 11/1988 | .................... 310/260 |
| JP | 05002703 A * | 1/1993 | .................... 360/110 |

* cited by examiner

DEVICE FOR THE AXIAL LOCKING OF A GUIDE SHAFT BEARING IN A TURBOMACHINE

The invention relates to a guide shaft bearing in a turbomachine as well as a turbomachine equipped with such a bearing.

TECHNOLOGICAL BACKGROUND OF THE INVENTION

A guide bearing of a rotating shaft usually comprises two internal and external rings tightening rolling units, the external ring being mounted on a fixed portion and the internal ring being mounted on a cylindrical contact surface of the shaft. The internal ring of the guide bearing can be locked axially at one end on an annular radial edge of the cylindrical contact surface of the shaft and at the other end by a screwed element on a threaded portion of this cylindrical contact surface.

In known embodiments, the element that provides by one end the tightening of the internal ring on the edge of the cylindrical contact surface, comprises means for sealing the enclosure containing the guide bearing and the oil in suspension. For this, this element comprises for example labyrinth seals interacting with tracks of abradable material borne by a wall of this enclosure.

When the shaft guided in such a bearing is a shaft of a high-pressure compressor of a turbojet, it is connected by a pair of bevel gears (IGB or Inlet GearBox) to a radial drive shaft of certain equipment comprising in particular a fuel pump. The guide bearing of the shaft of the compressor and the pair of bevel gears (IGB) form a modular unit which is provided assembled by its supplier before its assembly in the turbojet.

This module comprises an upstream wedge placed between the annular edge of the cylindrical contact surface of the shaft and the internal ring of the bearing, which must be in contact on this edge. This wedge is re-machined before the assembly of the module, in such a way as to correctly position the bevel gear of the shaft of the compressor in relation to the bevel gear of the radial shaft, in order to provide proper gear mesh of the pair of bevel gears.

This module must provide, without re-machining during the engine assembly, correct positioning of the rotor of the high-pressure compressor in relation to its stator.

For this purpose, the module provided assembled must comply with a precise tolerance, an axial dimension between the laying plane of the support of the pair of bevel gears (IGB) and a radial face of the screwed element which forms an axial abutment of the shaft of the high-pressure compressor. The tolerance on this axial dimension is much less than the sum of the tolerances of the corresponding parts (the support of the pair of bevel gears, the guide bearing of the shaft and the screwed element), in such a way that the supplier of the module must re-machine one of these parts in order to comply with the tolerance on the axial dimension of the unit.

It is in general the upstream end of the screwed element that is applied on the internal ring of the bearing, that is re-machined. Another possibility is to place a wedge between the internal ring of the bearing and the screwed element. This leads to the supplier of the module unscrewing and rescrewing this element in the module, which is a delicate operation due to the low threaded length of this element, of the low radial dimension of the threads and of the risk of damaging the wipers of the labyrinth seals of this element by the tools used.

Indeed, the use of a tool for screwing the element can damage the wipers of the labyrinth seals, leading to a decrease in the effectiveness of the sealing of the labyrinth seals, which causes a lubricating oil leak of the enclosure containing the guide bearing.

Furthermore, the low dimensions of the threadings of the cylindrical contact surface and of the screwed element result in a poor centering of the element on the cylindrical contact surface. As such, the clearance required between the labyrinth seals and the abradable tracks required to pressurise the enclosure containing the guide bearing, cannot be obtained, which results in a premature wear of the abradable tracks as well as in a poor sealing of the enclosure of the guide bearing.

SUMMARY OF THE INVENTION

The invention has in particular for purpose to avoid these disadvantages in a simple, effective and economic way.

It proposes to this effect, a guide shaft bearing in a turbomachine comprising an internal ring adapted to be mounted on a cylindrical contact surface of a shaft and an axial locking ring of this ring, characterised in that the ring is mounted sliding on the cylindrical contact surface and an annular rib made of shape memory material is mounted in an annular area delimited by two annular grooves facing each other and formed in the cylindrical contact surface and in the internal surface of the ring, the annular rib being able to expand radially by shape memory effect when it is subjected to a temperature greater than a transition temperature of its material to pass from a position where it is contained in the groove of the cylindrical contact surface to a locking position of the ring on the cylindrical contact surface.

According to the invention, the threadings of the ring and of the cylindrical contact surface are replaced by annular grooves which are simpler to machine and which have less risk of being degraded during the operations of assembly-dismantling of the ring. When the annular rib made of shape memory material is subjected to a temperature less than the transition temperature of its material, it becomes sufficiently flexible to be inserted into the annular groove of the cylindrical contact surface. The ring is then mounted sliding on the cylindrical contact surface, which does not require any specific tool and which avoids any damage to the ring. The rise in the temperature of the rib beyond the transition temperature of its material allows for its radial expansion inside the groove of the ring, which provides the axial locking of the ring on the cylindrical contact surface and consequently the axial locking of the internal ring on this cylindrical contact surface.

Advantageously, the shape memory effect is a one-way shape memory effect, which makes it possible to carry out a greater number of deformation cycles between the contracted form and the expanded form than with a two-way shape memory effect. It is as such possible to maintain the same rib for a longer period of time.

The transition temperature of the shape memory material is less than 20° C. and is preferentially of about 15° C. The transition temperature of the shape memory material is chosen so that the rib expands under a temperature corresponding to the ambient temperature in turbomachine assembly workshops.

According to another characteristic of the invention, the width of the rib is substantially equal to the width of the groove of the cylindrical contact surface.

The width of the groove of the ring can be slightly greater than that of the groove of the cylindrical contact surface in order to guarantee, when the ring is mounted sliding on the cylindrical contact surface, that the groove of the cylindrical contact surface exits radially into the groove of the ring, which allows for the radial expansion of the rib into the groove of the ring.

In an embodiment of the invention, the rib is of circular section.

Alternatively, the rib and the grooves can be of substantially rectangular or square section.

According to another characteristic of the invention, the grooves of the cylindrical contact surface and of the ring have substantially the same width.

The external periphery of the rib can include a chamfer on the side of the internal ring of the bearing and the groove of the ring an oblique wall whereon the chamfer of the rib comes into contact in order to axially solicit the ring towards the internal ring.

When the temperature is greater than the transition temperature of the shape memory material, the rib expands and its chamfer comes in contact with the oblique wall of the groove of the ring, which results in a pushing of the ring towards the internal ring. In this way, the rib exerts the function of axial locking of the ring on the cylindrical contact surface as well as that of the tightening of the ring on the internal ring. The tightening is made possible by the fact that the rib exerts a force on the ring that is sufficient to push the ring in the direction of the internal ring.

The rib is more preferably split, in order to facilitate its insertion into the groove of the cylindrical contact surface.

The invention also relates to a turbomachine, such as a turbojet or a turboprop, characterised in that it comprises a guide shaft bearing such as described hereinabove, the shaft being able to be the drive shaft of the rotor of a high-pressure compressor.

BRIEF DESCRIPTION OF THE DRAWINGS

The invention shall be better understood and other details, advantages and characteristics of the invention shall appear when reading the following description given by way of a non-limiting example, in reference to the annexed drawings wherein.

DETAILED DESCRIPTION

Figure 1:
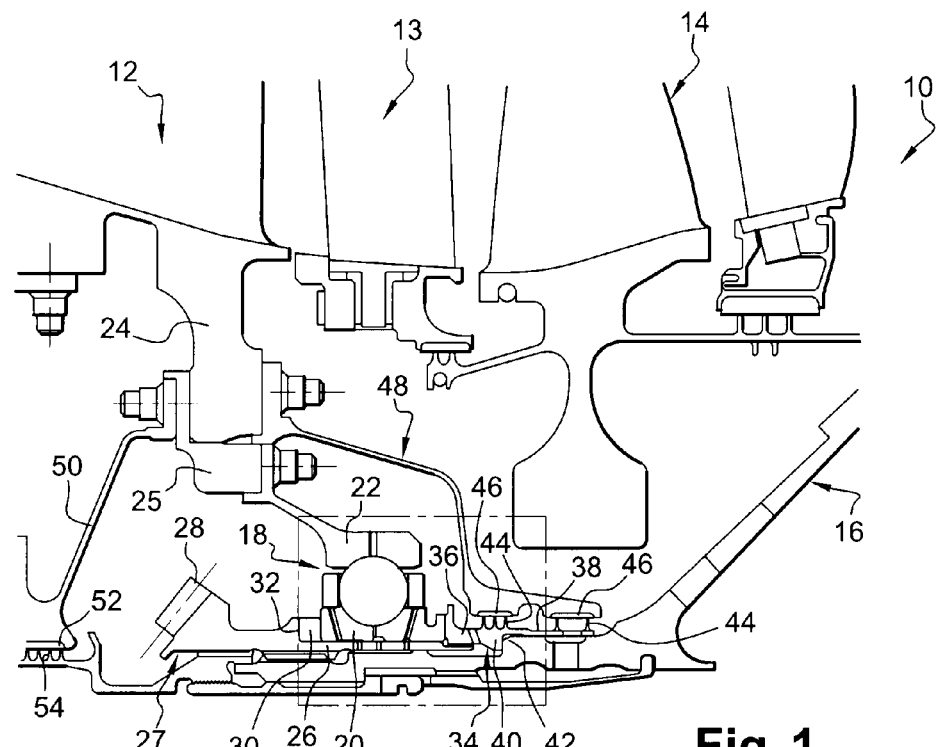
FIG. 1 is a schematic half-view in axial section of a guide shaft bearing of a high-pressure compressor according to prior art.
Figure 2:
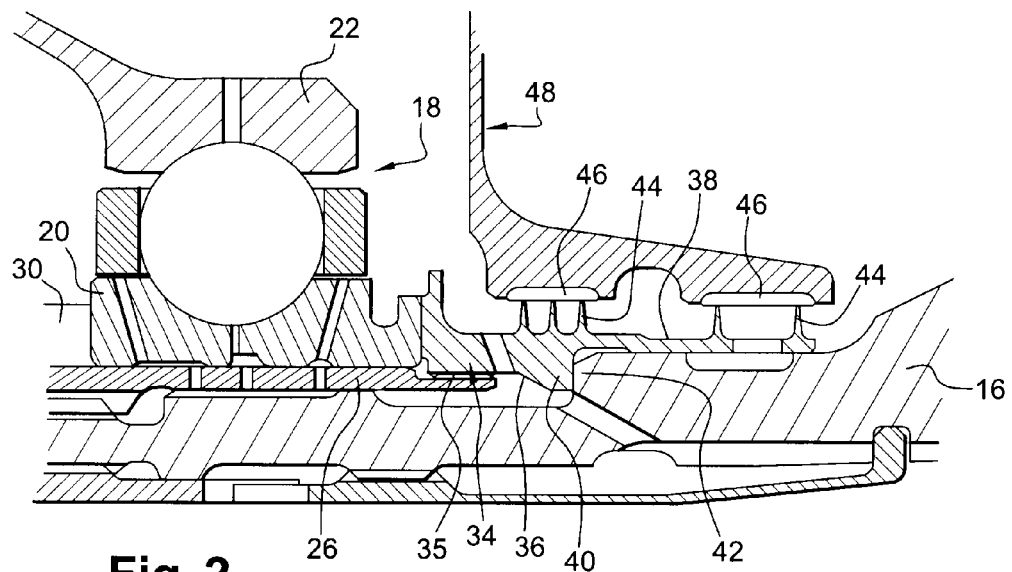
FIG. 2 is a schematic view on a greater scale of the zone delimited with a dotted line in FIG. 1.

Reference is first made to FIGS. 1 and 2 which show a high-pressure compressor 10 arranged downstream of an intermediate housing 12 of a turbomachine such as an aircraft turbojet or turboprop. The high-pressure compressor 10 comprises a stator 13 and a rotor 14 driven by a shaft 16 which is borne and guided at its upstream end by a bearing 18 comprising an internal ring 20 secured in rotation to the shaft 16 and an external ring 22 fixed by bolting on an annular support 25 fixed to a flange 24 of the intermediate housing 12.

A bevel gear 27 is mounted on the upstream end of the shaft 16 of the high-pressure compressor 10 and comprises downstream a cylindrical contact surface 26 inserted between the shaft 16 and the internal ring 20 of the guide bearing 18. The gear 27 comprises at its upstream end a tapered gear teeth 28 meshing with a bevel gear of the internal end of a radial shaft arranged in a passage strut (not shown) of the intermediate housing 12. The bevel gear 27 makes it possible to transmit a portion of the spin torque of the shaft 16 of the high-pressure compressor 10 to the radial shaft in order to operate equipment located on the external periphery of the turbomachine.

The internal ring 20 of the bearing 18 is locked axially upstream on an annular wedge 30 applied against an annular radial edge 32 of the upstream end of the cylindrical contact surface 26 of the bevel gear 27 and downstream by a ring 34 screwed onto an external threading 35 of the cylindrical contact surface 26. The unit constituted of the bearing 18, of the bevel gears, of the wedge 30 and of the ring 34 is a modular unit which is provided pre-assembled before its assembly in the turbomachine. The machining of the annular wedge 30, before assembly of the modular unit, makes it possible to ensure during the assembly of the modular unit in the turbomachine, an optimal axial positioning of the bevel gear 27 in such a way that it meshes perfectly with the bevel gear of the radial shaft.

The ring 34 comprises (FIG. 2) an upstream cylindrical wall 36 connected at its downstream periphery to a downstream cylindrical wall 38 of a smaller thickness than the thickness of the upstream wall 36. The joint between the upstream 36 and downstream 38 cylindrical walls forms an internal annular radial shoulder 40 whereon an annular shoulder 42 of the shaft 16 of the high-pressure compressor 10 is applied, which makes it possible to axially lock the ring 34.

The downstream ends of the upstream 36 and downstream 38 cylindrical walls each include a labyrinth seal 44 interacting with abradable tracks 46 borne by an annular wall 48 fixed by bolting on the downstream face of the flange 24 of the intermediate housing 12. A truncated wall 50 with a reducing section in the upstream direction is fixed by bolting to its external periphery on the upstream face of the flange 24 of the intermediate housing 12 and bears at its internal periphery abradable tracks 52 interacting with a labyrinth seal 54 secured in rotation to the shaft 16 of the high-pressure compressor 10. The walls 48 and 50 as such make it possible to provide the sealing of the enclosure containing the guide bearing 18 and preventing the lubricating oil of the bearing 18 which is in suspension from escaping from the enclosure.

This type of axial maintaining of the internal ring 20 of the guide bearing 18 by screwing of the ring 34 on the cylindrical contact surface 26 is not satisfactory for the reasons indicated hereinabove.

Figure 3:
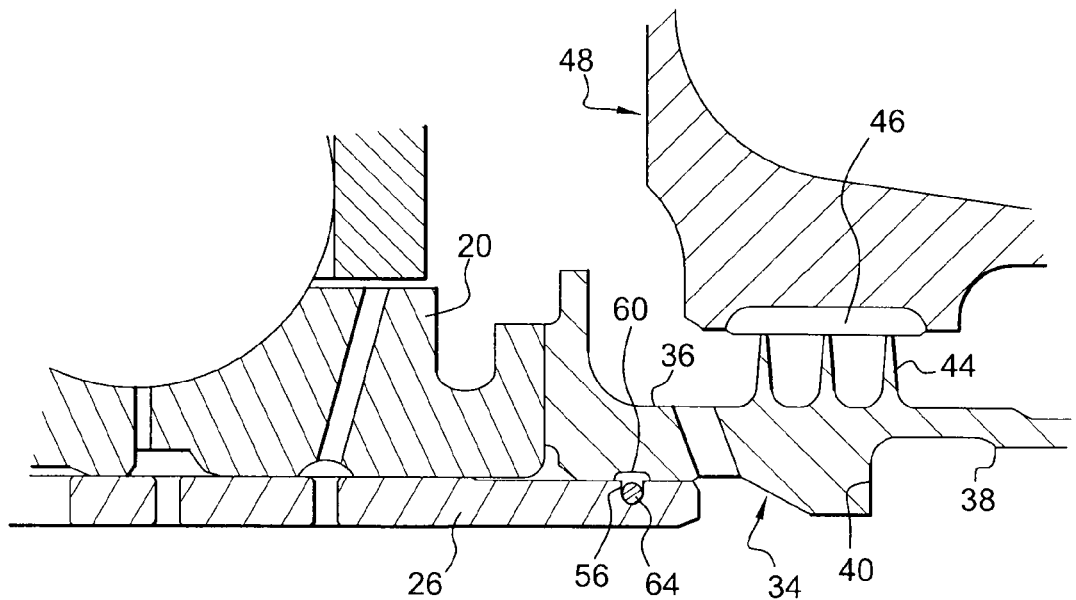
FIG. 3 is a schematic view in axial section of an end of an internal ring of a guide bearing and of an annular rib mounted in an annular groove of the cylindrical contact surface according to an embodiment of the invention.
Figure 4:
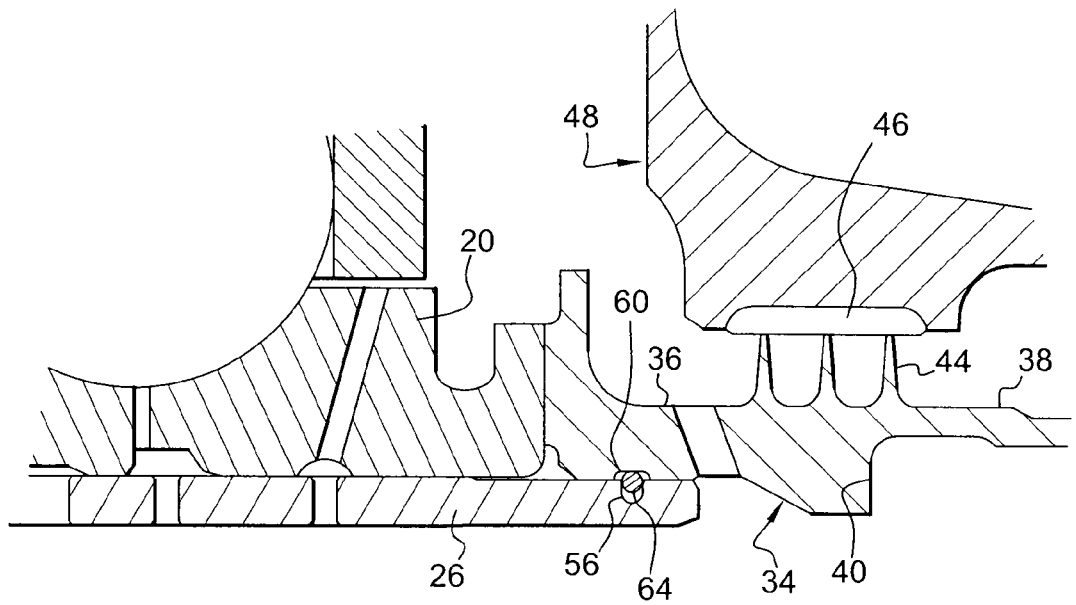
FIG. 4 is a view identical to FIG. 3 wherein the rib is in axial locking position of the internal ring.
Figure 5:
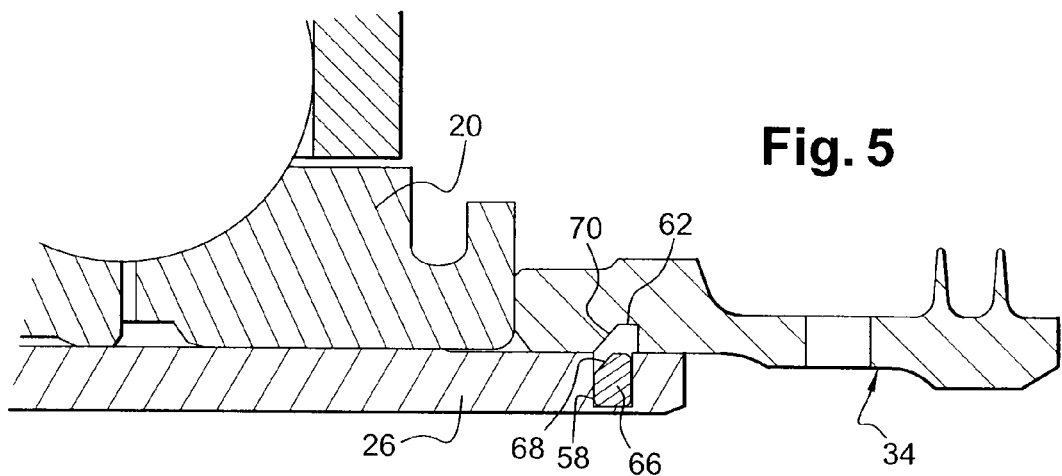
FIG. 5 is a schematic view in axial section of an end of the internal ring of a guide bearing and of an annular rib mounted in a groove of the cylindrical contact surface according to an alternative of the invention.
Figure 6:
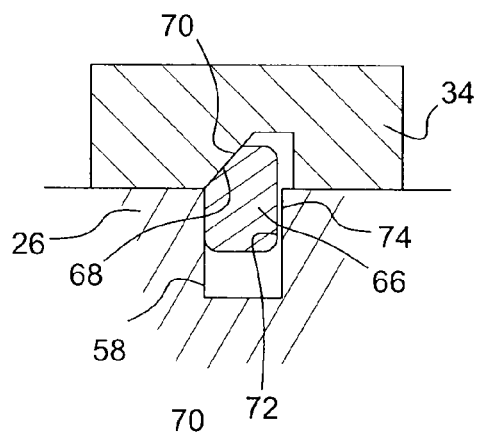
FIGS. 6 to 8 show the successive phases of radial expansion of the annular rib in FIG. 5, leading to the locking and to the tightening of the ring on the internal ring of the guide bearing.

According to the invention, the threadings of the cylindrical contact surface 26 and of the ring 34 are replaced by two annular grooves facing each other, the one 56 being formed in the cylindrical contact surface 26 and the other 60 being formed in the internal surface of the ring 34 (FIG. 3). The axial locking of the ring 34 sliding on the cylindrical contact surface 26 is provided by an annular rib 64 made from a shape memory material able to expand radially when it is subjected to a temperature greater than a transition temperature of its material in order to pass from a position where it is fully contained in the groove 56 of the cylindrical contact surface 26 (FIG. 3) in a position of locking the ring 34 on the cylindrical contact surface 26 (FIG. 4). In this locking position of the ring 34 on the cylindrical contact surface 26, the external periphery of the rib 64 is inside the groove 58 of the ring 34 and the internal periphery of the rib 64 is inside the groove 56 of the cylindrical contact surface 26 (FIG. 4).

The annular rib 64 is made from a shape memory material having a one-way shape memory effect. For this purpose, the rib 64 is subjected beforehand to an education phase wherein it is in a first step conformed in an expanded position in such a way that its external periphery is located outside the groove 56 of the cylindrical contact surface 26, at a temperature greater than the transition temperature of the shape memory material in such a way that the latter is in austenitic phase.

Then, in a second step, the rib 64 is retightened onto itself mechanically so that its external periphery is located in the groove 56 of the cylindrical contact surface 26, at a temperature less than the aforementioned transition temperature in such a way that the shape memory material is then in martensitic phase. For this purpose, the depth of the annular groove 56 of the cylindrical contact surface 26 is at least equal to the radial thickness of the rib 64.

The rib 64 is then ready to undergo a radial expansion when the temperature increases up to the transition temperature of the shape memory material.

Due to the irreversible nature of the one-way shape memory effect, the rib 64 maintains its expanded form regardless of later changes in the temperature.

In the first embodiment of the invention shown in FIGS. 3 and 4, the rib 64 is of circular section and the bottom of the groove 56 of the cylindrical contact surface 26 is semi-circular. The diameter of the section of the rib 64 is substantially equal to the axial width of the groove 56 of the cylindrical contact surface 26. The width of the groove 60 of the ring 34 is greater than that of the groove 56 of the cylindrical contact surface 26 in order to guarantee during the assembly of the ring 34, that its annular groove 60 comes to position itself opposite the groove 56 of the cylindrical contact surface 26, in order to allow for the radial expansion of the rib 60 from the groove 56 of the cylindrical contact surface 26 in the groove 60 of the ring 34.

The depth of the annular groove 60 of the ring 34 is less than the diameter of the section of the rib 64 and is of a magnitude of half of this diameter. In expanded state, the rib 64 is as such partially inside the groove 60 of the ring 34 and partially inside the groove 56 of the cylindrical contact surface 26 (FIG. 4).

It is preferable that the external diameter of the rib 64 in the expanded state be slightly higher than the diameter at the bottom of the groove 60 of the ring 34 so that the entire external periphery of the rib 64 comes into contact with the bottom of the groove 60 of the ring 34, in order to lock the annular rib 64 in the bottom of the groove 60 of the ring 34.

The axial locking of the internal ring 20 on the cylindrical contact surface 26 takes place in the following way: the annular rib 64 is mounted in the groove 60 of the cylindrical contact surface 26 at a temperature less than the transition temperature of the shape memory material in such a way that the rib 64 which is in martensitic phase is flexible. The ring 34 is then mounted sliding on the cylindrical contact surface 26 so that its upstream end comes into contact with the downstream end of the internal ring 20 and in such a way that its annular groove 60 and the annular groove 56 of the cylindrical contact surface 26 are facing each other. The increase in the temperature above the transition temperature induces a passage of the rib 64 to austenitic phase resulting in an increase in its rigidity and in its radial expansion inside the groove 60 of the ring 34, in order to lock the ring 34 on the cylindrical contact surface 26.

The dismantling is carried out by cooling the internal ring 20 which through conduction cools the rib 64 and causes it to pass from its rigid state in austenitic phase to its flexible state in martensitic phase, the rib 64 remaining in expanded state. A traction effort in the downstream direction exerted on the ring 34 allows the rib 64 to be contracted radially in the groove 56 of the cylindrical contact surface 26 and authorises a dismantling of the ring 34 and of the internal ring 20.

In the second embodiment of the invention, shown in FIGS. 5 to 8, the groove 58 of the cylindrical contact surface 26 has a rectangular section and the annular rib 66 is of rectangular section and comprises on its external periphery a chamfer 68 located on the side of the internal ring 20. The groove 62 of the ring 34 is of semi-trapezoidal section and comprises an oblique wall 70 or frustoconical wall with a reducing section in the upstream direction, substantially parallel to the chamfered surface 68 of the annular rib 66.

Figure 7:
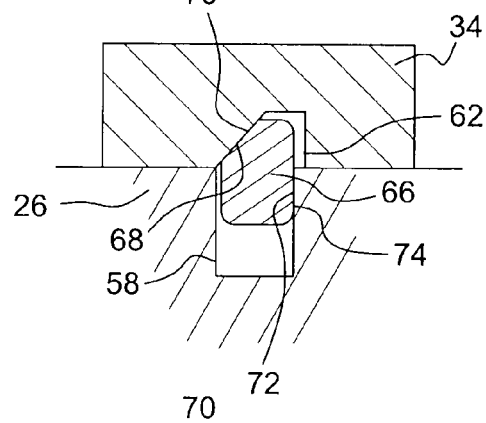
Figure 8:
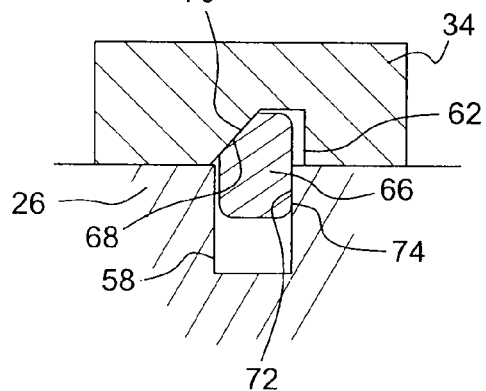

In this alternative, the rib 66 exerts the function of the locking of the ring 34 on the cylindrical contact surface 26 as well as a function of tightening of the ring 34 on the downstream end of the internal ring 20. Indeed, when the temperature increases and passes above the transition temperature of the shape memory material, the rib 66 expands radially and its chamfer 68 comes into contact with the oblique wall 70 of the groove 62 of the ring 34 (FIG. 6), which provokes a shift in the downstream direction of the rib 66 in the groove 58 of the cylindrical contact surface 26, until the downstream face 72 of the rib 66 comes in contact with the downstream face 74 of the groove 58 of the cylindrical contact surface 26 (FIG. 7). In this position, the rib 66 is locked downstream and its radial expansion results in that its chamfered surface 68 presses on the oblique wall 70, which induces on the ring an axial force directed towards the internal ring 20 of the guide bearing 18, and makes possible a pushing upstream of the ring 34 and therefore a tightening of the ring 34 on the downstream end of the internal ring 20 (FIG. 8).

The tightening is made possible by the fact that the rib 66 exerts sufficient force on the ring 34 in the direction of the internal ring 20. This force is for example of a magnitude of five times greater than the force needed for the deformation of the rib 66 during the learning phase.

The groove 62 of the ring 34 has an axial length that is slightly greater than that of the groove 58 of the cylindrical contact surface 26.

During the step of dismantling, the integration of a chamfer 68 on the annular rib 66 interacting with an oblique wall 70 of the groove 62 of the ring 34 facilitates the contraction of the annular rib 66 in the groove 58 of the cylindrical contact surface 26 comparatively to an annular rib 64 without chamfer.

The invention described as such avoids any risk of damage of the labyrinth seals 44 borne by the ring 34 and provides an optimal sealing of the enclosure containing the guide bearing 18. The sliding assembly of the ring 34 allows for simple and effective centering of the latter on the cylindrical contact surface 26. The transition temperature of the shape memory material is chosen to correspond approximately to an ambient temperature in the turbomachine assembly workshops, which makes it possible for the rib to remain in austenitic phase and as such retain good rigidity providing an effective locking of the ring 34 on the cylindrical contact surface 26.

The transition temperature of the shape memory material can be less than 20° C. and is advantageously of a magnitude of 15° C.

The annular rib 64, 66 is split, in order to facilitate its insertion into the groove of the cylindrical contact surface 26 in its contracted form.

It is also possible to use an annular rib 64, 66 having a two-way shape memory effect, i.e. able to expand when the temperature increases beyond the transition temperature of its material and also able to contract when the temperature decreases below this same transition temperature. However, the one-way shape memory effect allows for a greater number of deformation cycles between the initial state and the expanded state than with an annular rib with two-way shape memory effect, which makes it possible to increase the lifespan of an annular rib.

In the description hereinabove, the term "cylindrical contact surface" was used to designate a cylindrical contact surface fixed to the shaft of rotation of the high-pressure compressor. The invention applies of course to the case where the cylindrical contact surface is an integral part of the rotating shaft.

The invention claimed is:

1. A guide shaft bearing in a turbomachine, comprising:
   an internal ring adapted to be mounted on a cylindrical contact surface of a shaft; and
   an axial locking ring which locks the internal ring,
   wherein the locking ring is mounted sliding on the cylindrical contact surface,
   wherein an annular rib made of shape memory material is mounted in an annular area delimited by two annular grooves facing each other and formed in the cylindrical contact surface and in an internal surface of the locking ring, the annular rib being able to expand radially by shape memory effect when the annular rib is subjected to a temperature greater than a transition temperature of its material to pass from a position wherein the annular rib is contained in the groove of the cylindrical contact surface to a locking position of the locking ring on the cylindrical contact surface, and
   wherein a width of the groove of the locking ring is greater than that of the groove of the cylindrical contact surface.

2. The bearing according to claim 1, wherein the shape memory effect is a one-way shape memory effect.

3. The bearing according to claim 1, wherein the transition temperature of the shape memory material is less than 20° C.

4. The bearing according to claim 1, wherein the transition temperature of the shape memory material is approximately 15° C.

5. The bearing according to claim 1, wherein the width of the rib is substantially equal to the width of the groove of the cylindrical contact surface.

6. The bearing according to claim 1, wherein the rib is of circular section.

7. The bearing according to claim 1, wherein the rib and the grooves are of substantially rectangular or square section.

8. The bearing according to claim 1, wherein the external periphery of the rib comprises a chamfer on the side of the internal ring of the bearing and the groove of the ring comprises an oblique wall whereon the chamfer of the rib comes into contact in order to axially solicit the ring towards the internal ring.

9. A turbomachine, comprising a steady shaft bearing according to claim 1.

10. The turbomachine according to claim 9, wherein the shaft is connected to the rotor of a high-pressure compressor.

11. The turbomachine according to claim 9, wherein the turbomachine consists in a turbojet or a turboprop.

12. A guide shaft bearing in a turbomachine, comprising:
    an internal ring adapted to be mounted on a cylindrical contact surface of a shaft; and
    an axial locking ring which locks the internal ring,
    wherein the locking ring is mounted sliding on the cylindrical contact surface,
    wherein an annular rib made of shape memory material is mounted in an annular area delimited by two annular grooves facing each other and formed in the cylindrical contact surface and in an internal surface of the locking ring, the annular rib being able to expand radially by shape memory effect when the annular rib is subjected to a temperature greater than a transition temperature of its material to pass from a position wherein the annular rib is contained in the groove of the cylindrical contact surface to a locking position of the locking ring on the cylindrical contact surface, and
    wherein the locking ring includes an upstream cylindrical wall connected at its downstream periphery to a downstream cylindrical wall, a thickness of the upstream cylindrical wall is greater than a thickness of the downstream cylindrical wall, and a joint between the upstream cylindrical wall and the downstream cylindrical wall presents an internal annular radial shoulder which abuts an annular shoulder of a high-pressure compressor shaft.

13. The bearing according to claim 12, wherein one of the annular grooves is provided in an internal surface of the upstream cylindrical wall of the locking ring and the other of the annular grooves is provided in an outer circumferential surface at a first end of the cylindrical contact surface.

14. The bearing according to claim 12, wherein an upstream end face of the upstream cylindrical wall abuts a downstream end face of the internal ring.

* * * * *